United States Patent
Kim et al.

(10) Patent No.: US 10,212,952 B2
(45) Date of Patent: Feb. 26, 2019

(54) COMPOSITION AND METHOD TO SUPPRESS WHEY FLAVOR

(75) Inventors: Dennis Ann Kim, Palatine, IL (US); Lisa A. Dierbach, Arlington Heights, IL (US); Andrew E. McPherson, Mount Prospect, IL (US); Allison R. Bull, Mount Prospect, IL (US); Tracy Joella Sanborn, Glen Ellyn, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 256 days.

(21) Appl. No.: 13/413,366

(22) Filed: Mar. 6, 2012

(65) Prior Publication Data

US 2013/0236621 A1    Sep. 12, 2013

(51) Int. Cl.

| | |
|---|---|
| *A23C 21/08* | (2006.01) |
| *A23C 19/076* | (2006.01) |
| *A23C 19/086* | (2006.01) |
| *A23C 13/16* | (2006.01) |
| *A23C 19/084* | (2006.01) |

(52) U.S. Cl.
CPC ............ *A23C 19/076* (2013.01); *A23C 13/16* (2013.01); *A23C 19/084* (2013.01); *A23C 19/086* (2013.01)

(58) Field of Classification Search
CPC ..... A23C 19/076; A23C 19/084; A23C 13/16; A23C 19/086
USPC ....................................................... 426/548
See application file for complete search history.

(56) References Cited

U.S. PATENT DOCUMENTS

| | | |
|---|---|---|
| 4,919,941 A | 4/1990 | Zibell |
| 4,963,387 A | 10/1990 | Nakagawa et al. |
| 5,753,288 A | 5/1998 | Ogawa |
| 5,882,704 A | 3/1999 | Yamaguchi et al. |
| 6,420,527 B1 | 7/2002 | Bolen et al. |
| 6,830,766 B2 | 12/2004 | McCabe |
| 6,913,774 B2 | 7/2005 | Cha et al. |
| 6,913,906 B2 | 7/2005 | Bolen et al. |
| 2003/0008046 A1* | 1/2003 | Gerlat et al. ................. 426/534 |
| 2005/0013923 A1* | 1/2005 | Shimek et al. ............... 426/660 |
| 2005/0064079 A1* | 3/2005 | Allen et al. .................. 426/549 |
| 2005/0095349 A1 | 5/2005 | McCabe |
| 2005/0129825 A1 | 6/2005 | Gray et al. |
| 2007/0059421 A1 | 3/2007 | Catani et al. |
| 2008/0260925 A1* | 10/2008 | Zink ............................ 426/548 |
| 2009/0104320 A1 | 4/2009 | Gray et al. |
| 2010/0068344 A1 | 3/2010 | Fukuda et al. |
| 2010/0151055 A1 | 6/2010 | Riess et al. |
| 2010/0310751 A1 | 12/2010 | Gelin et al. |

FOREIGN PATENT DOCUMENTS

| | | |
|---|---|---|
| DE | 19938601 A1 * | 2/2001 |
| JP | 58005172 A | 1/1983 |
| JP | 2001112422 A | 4/2001 |
| JP | 2002253164 A | 9/2002 |

OTHER PUBLICATIONS http://www.foodproductdesign.com/, accessed on Aug. 19, 2013 Flavor Enhancement: Taking a Closer Look By: Alex Merolli Posted on: Feb. 1, 1997.*
Schulz-Collins et al. Acid- and Acid/Rennet-curd Cheeses Part A: Quark, Cream Cheese and Related Varieties in "Cheese: Chemistry, Physics and Microbiology", Third edition vol. 2: Major Cheese Groups, p. 301 and p. 303. Elsevier Ltd., 2004.*
Intellectual Property Office of New Zealand First Examination Report dated Feb. 26, 2013 for New Zealand Application 607430, 2 pages.

* cited by examiner

*Primary Examiner* — Subbalakshmi Prakash
(74) *Attorney, Agent, or Firm* — Fitch, Even, Tabin & Flannery LLP

(57) ABSTRACT

A whey containing composition having a reduced whey flavor is provided. The composition includes whey and about 0.01 ppm to about 10 ppm thaumatin.

3 Claims, No Drawings

COMPOSITION AND METHOD TO SUPPRESS WHEY FLAVOR

FIELD

The present composition and method relate to reducing and or masking whey flavor notes in food products, and more specifically, the use of thaumatin to reduce or otherwise mask undesirable whey flavor notes in food products.

BACKGROUND

In recent years, whey proteins have become widely used in food products. For example, whey protein has been used in dairy-type foods, such as cheese and other cheese products. In some food products, such as when the amount of whey protein is significant, the flavors found in whey protein materials may become discernable in the product and may interfere with desired flavor profiles, especially in products having delicate or subtle flavor profiles. For example, in certain lower fat products, whey protein flavor notes may become more noticeable and may interfere with the desired flavor profile of the product. The interference by the whey flavor notes on the product flavor profile may be so undesirable to some consumers such that the flavor may prevent acceptance of the product.

SUMMARY

In one form, a whey containing composition having a reduced whey flavor is provided. The composition includes whey and about 0.01 ppm to about 10 ppm thaumatin.

According to one form, a food product having a reduced whey flavor is provided. The food product includes about 0% to about 32% fat, whey and about 0.01 ppm to about 10 ppm thaumatin.

In yet another form, a whey containing food product having a reduced whey flavor is provided. The food product includes whey and an effective amount of thaumatin to mask flavor notes imparted to the composition from whey.

In accordance with one form, the thaumatin is in the range of about 0.1 ppm to about 1 ppm.

According to one form, the whey and the thaumatin are present in a ratio from about 1,200,000:1 to about 4000:1.

In one form, the composition further includes about 0% to about 32% fat.

According to one form, the composition is in the form of a food product selected from the group consisting of cream cheese, processed cheese, cottage cheese, dry cheese powder and sour cream In one form, method for reducing the flavor of whey in a food product is provided. The method includes the steps of providing a food product containing whey and adding an effective amount of thaumatin to the food product to mask flavor notes imparted to the composition from whey.

DETAILED DESCRIPTION

A composition having reduced whey flavor notes is provided wherein an effective amount of thaumatin is added to the composition to reduce or otherwise mask undesirable whey flavor notes. The composition may include whey protein containing food products, such as dairy products, including, but not limited to cream cheese, processed cheese, cottage cheese, sour cream and other products. However, depending on the flavor profile and compositional makeup of the product, whey flavor notes, such as cardboard, barn, green flavor characteristics and other flavor notes may become more noticeable if the food products are not modified as described herein. Thus, the compositions herein reduce and, in some cases, eliminate cardboard, barn, and/or green flavor characteristics, which are generally referred to herein as undesired whey flavor notes.

In one aspect, it has been found that certain amounts of thaumatin and, in some cases, certain amounts of thaumatin relative to the amount of whey in a composition act to reduce or otherwise mask undesirable whey flavor notes when used in lower concentrations. Thaumatin is a natural sweetener that is approximately 1600 times as sweet as sugar. For example, in one form, it has been found that thaumatin used in the range of about 0.01 ppm to about 10 ppm is effective to mask or reduce undesirable whey flavor notes. In another form, thaumatin used in the range of about 0.1 ppm to about 1 ppm is effective to mask undesirable whey flavor notes. However, it should be understood by those skilled in the art that other concentrations of thaumatin may be used depending on a number of factors, including, but not limited to, the type of whey protein, the amount of fat content, the overall compositional makeup and other factors relating to the food product. If thaumatin above these ranges is used in the composition, it tends to actually enhance the undesirable whey flavor notes. Thaumatin below these ranges has no effect.

In another aspect, thaumatin may be used in certain ratios relative to whey protein to reduce or otherwise mask undesirable whey flavor notes. For example, in one form, it is believed that a ratio of whey protein to thaumatin of approximately 4000:1 to approximately 1,200,000:1 may be effective to reduce or otherwise mask undesirable whey flavor notes. It should be understood by those skilled in the art that other ratios of whey protein to thaumatin may be used depending on a number of factors, including, but not limited to, the type of whey protein, the amount of fat content, the overall compositional makeup and other factors relating to the food product.

The ability to reduce or otherwise mask whey flavor notes is unique to thaumatin. Other natural sweeteners do not show similar qualities reducing or otherwise masking undesirable whey flavor notes as thaumatin. For example, sweeteners such as neotame, NHDC, lohan guo, stevia, sucrolose and sucrose do not exhibit the same qualities when used in equivalent sweetness quantities as low concentration thaumatin, such as 0.1 ppm. Therefore, thaumatin exhibits unique properties to reduce or otherwise mask undesirable whey flavor notes when compared to other comparable sweeteners.

In one form, it may be desirable to use thaumatin to reduce or otherwise mask undesirable whey flavor notes in food products having no fat or low fat. Generally in lower fat food products, the whey flavor notes become more prevalent when compared to higher fat counterparts. In one form, using thaumatin in food products containing whey protein and about 0% to about 17% fat content may help to reduce or otherwise mask undesirable whey flavor notes. In yet another form, using thaumatin in food products containing whey protein and about 17% to about 32% fat content may help to reduce or otherwise mask undesirable whey flavor notes. However, it should be understood by those skilled in the art that thaumatin may be suitable to reduce or otherwise mask undesirable whey flavor notes in food products containing any amount of fat or no fat at all.

Thaumatin may be used to suppress the whey flavor notes from a variety of types of whey proteins. Generally, whey proteins relate to the proteins contained in dairy liquid obtained as a supernatant of the curds when milk of a dairy liquid containing milk components are curded to produce a cheese making curd as a semisolid. For example, whey proteins that may be suitable for the compositions herein include sweet whey, acid whey, individual whey proteins and mixtures thereof. Suitable commercial sources of native whey protein and other types of whey proteins, including, but not limited to, milk protein concentrate (MPC) and whey protein concentrate (WPC), may also be used as understood by those skilled in the art.

Thaumatin may be used in a variety of food products to reduce or otherwise mask undesirable whey flavor notes. For example, thaumatin may be used in dairy food products containing whey protein including, but not limited to cream cheese, processed cheese, cottage cheese, sour cream and related products. It should also be understood by those skilled in the art that thaumatin may also be used in other non-dairy food products to reduce or otherwise mask undesirable whey flavor notes.

In one form, thaumatin may be added at any point in the food product manufacturing process. For example, in one form, such as in the manufacture of cream cheese, thaumatin may be added relatively early on in the food process to provide suitable thaumatin homogenization in the food product. However, those skilled in the art will understand that thaumatin may be added at any desired point in the manufacturing process.

It is hypothesized that thaumatin may act to bind to taste receptor sites on consumer's tongue and thereby interrupt or otherwise minimize the perception of whey flavor notes. In this regard, it hypothesized that this interruption may be the result of the structure of thaumatin. It is further hypothesized that once a threshold amount or ratio of thaumatin is present in the food product the thaumatin may lose its masking effect and/or may otherwise change the base flavor profile of the food product such that undesired flavor notes may be perceived.

EXAMPLES

A number of examples were prepared which highlight the above-described characteristics and use of thaumatin to reduce or mask undesirable whey flavor notes. Percentages are provided in this disclosure in weight percent unless otherwise noted.

Examples 1, 2 and 4 were prepared using a cream cheese formula made from approximately 78% curd, 20% whey protein concentrate from Kraft Foods® and other flavor and texture additives and prepared generally according to EP1698231B1, incorporated herein by reference. The resulting cream cheese product contained approximately 10% fat and 8% total protein (including whey protein).

Example 1

A test was performed to determine the effect of thaumatin in products containing whey. A sample was prepared by taking thaumatin (0.2% solution) and hand mixing into the above described 10% fat cream cheese model bench top system to a final concentration of 1 ppm of thaumatin prior to packaging. The sample was stored in a refrigerator (5° C.) for a week prior to tasting in a round table format. The sample was compared with a control cream cheese composition of the same formula, but containing no thaumatin. Participants who tasted both samples stated that the control composition was astringent and had additional flavor notes of butter after initial tasting, cardboard and whey. The participants also stated that the sample with thaumatin had flavor notes that were cultured, sour, buttery, with the dairy impression added back. The participants did not comment on any whey flavor notes in the thaumatin sample and therefore it is believed that thaumatin reduced whey flavor notes.

Example 2

A follow-up study was performed by preparing a number of samples to compare the effect of thaumatin concentration on whey flavor notes. Further, the samples were prepared to see if there is any effect on flavor notes from the order of addition or from length of exposure to heat.

A series of cream cheese bench top model systems containing 10% fat were prepared as described above containing various concentrations of thaumatin (between 0.01 ppm to 10 ppm) which were hand mixed prior to packaging. The samples were stored in a refrigerator (5° C.) for a week prior to tasting in a round table format. The purpose was to determine if there is a concentration effect and also if there is any effect on the order of addition and having the thaumatin exposed to a longer period of heat. A control was prepared that did not contain thaumatin and all results are described when compared to the control. Participants stated that the control was astringent and contained a whey powder flavor along with some dairy and sour notes.

Sample A was prepared with 1 ppm thaumatin which was added along with gums early on in the manufacturing process, prior to heating, to check thermal stability. Participants stated that Sample A had less of a butter flavor, but was more sour with more of a cream cheese flavor than the control. The participants did not comment on the whey flavor and therefore it was believed there was a reduction in whey flavor notes.

Sample B was prepared with 0.01 ppm thaumatin which was added after heating and just prior to packaging. Participants stated that Sample B had a delayed sour flavor that removed some of the background whey flavor notes (cardboard, barn and green flavor characteristics) when compared with the control. Further, Sample B had a cleaner milk flavor with some astringency at the end.

Sample C was prepared with 0.1 ppm thaumatin which was added after heating and just prior to packaging. Participants stated that Sample C was slightly less sour than the control with more milk and butter flavor lingering at the end. Further, Sample C had more of a cream cheese flavor than the control. The participants did not comment on the whey flavor and therefore it was believed there was a reduction in whey flavor notes.

Sample D was prepared with 1 ppm thaumatin which was added after heating and just prior to packaging. Participants stated that Sample D was slightly less sour than the control. Further, Sample D was similar to Sample C, having more of a milk and butter flavor than the control with no whey flavor notes. It is hypothesized that this sample differs from Sample A as the thaumatin was added in Sample A much earlier in the process, therefore potentially providing better homogenization of the end product.

Sample E was prepared with 10 ppm thaumatin which was added after heating and just prior to packaging. Participants stated that Sample E was astringent, similar to the control. Further, Sample E had a muted flavor with some sour and milk flavor, but had less of a cheese flavor.

Generally, from the above Samples A-E, in one form, thaumatin in the range of 0.1 to 1 ppm may reduce whey flavor notes in cream cheese and similar food products. Further, while it is unclear if there is an effect from the order of addition, it is hypothesized that as the thaumatin is added earlier in the process it may achieve better homogenization in the end product. Additionally, it is hypothesized that temperature may also act to potentially denature some forms of thaumatin, but it should be understood that there are some forms of thaumatin that are more temperature resistant.

Example 3

Thaumatin was compared to other natural sweeteners. Samples were prepared using other known sweeteners to determine if other sweeteners help reduce whey flavor notes. Several high intensity sweeteners were added relative to their sweetness to sucrose to the 10% cream cheese model from Examples 1 and 2 and were added in an equivalent to 0.1 ppm thaumatin.

TABLE 1

Sweeteners and sweetness factors

| Sweetener | Sweetness Factor |
|---|---|
| Neotame | 8000x |
| NHDC | 2000x |
| lohan guo | 225x |
| stevia | 200x |
| sucrolose | 550x |
| sucrose | 1x |

These sweetener samples did not provide any discernable impact on the whey flavor notes found in the control.

Example 4

Further tests were prepared to determine the scalability of using thaumatin to reduce whey flavor notes. Three 10% fat cream cheese pilot plant model systems were made as described above containing various concentrations of thaumatin (0.05 ppm, 1 ppm, and 2 ppm). The samples were mixed for ten minutes in a kettle at a temperature of 165-190° F. prior to packaging and were stored in a refrigerator (5° C.) for a week prior to tasting in a round table format. The comparison was made with a control sample having no thaumatin.

The participants stated that the control had a whey flavor, was sour and cultured tasting. Further, the control did have some milk and butter flavor.

Sample F contained 0.5 ppm thaumatin. Participants stated that Sample F had less whey flavor notes than the control and was cultured tasting. Further, Sample F had a slight butter/milk aftertaste.

Sample G contained 1 ppm thaumatin. Participants stated that Sample G was less sour and had less of a whey flavor than Sample F and the control. Further, Sample G had a butter/milk flavor with a cultured flavor.

Sample H contained 2 ppm thaumatin. Participants stated that Sample H was less sour than Sample F and had a cultured, and slight butter flavor. Further, Sample H was more bland than Sample F. The participants did not comment on the whey flavor notes for this sample, but it is believed that there was some reduction in whey flavor notes.

Example 5

Additional tests were performed to determine the applicability in other products, such as cottage cheese. Cottage cheese has primarily two components—curd and dressing. Generally, the curd provides most of the texture and protein while the dressing provides much of the flavor, salt and any added nutrients and preservatives. The two components are usually matched to deliver the desired appearance, texture, flavor and stability.

Various versions of Breakstone's Cottage Cheese was used as the testing material. The three materials included 0% fat, 2% fat and 4% fat having compositions as illustrated below in Tables 2 and 3.

TABLE 2

Breakdown of cottage cheese compositions

| % Fat Cottage Cheese | 0% | 2% | 4% |
|---|---|---|---|
| total fat | 0.0% | 2.2% | 4.0% |
| carbohydrate | 6.2% | 5.3% | 4.4% |
| fiber | 0.0% | 0.0% | 0.0% |
| sugar | 5.3% | 3.5% | 3.5% |
| protein | 9.7% | 9.7% | 9.7% |
| Casein* | 7.8% | 7.8% | 7.8% |
| Whey* | 1.9% | 1.9% | 1.9% |

*calculated values from the protein value assuming 80/20 ratio of casein/whey in dairy protein.

TABLE 3

Composition of cottage cheese samples

| | |
|---|---|
| 0% | Cultured pasteurized grade a skim milk, whey, contains less than 2% of modified food starch, salt, potato maltodextrin, calcium phosphate, artificial color, mono- and diglycerides, guar gum, xanthan gum, artificial flavor, vitamin a palmitate, vitamin D3. |
| 2% | Cultured pasteurized grade a skim milk, milk and cream, whey, contains less than 2% of: modified food starch, salt, calcium phosphate, sodium phosphate, guar gum, natural flavor, vitamin a palmitate, vitamin D3. |
| 4% | Cultured pasteurized grade a skim milk, milk and cream, whey, contains less than 2% of modified food starch, salt, calcium, phosphate, natural flavor, vitamin D3. |

As shown in the above compositions, the cultured pasteurized Grade A skim milk, whey and milk and cream are sources of whey protein. However, it is theorized that most of the protein is from the skim milk which is used to form the cottage cheese curds. It is further theorized that the whey flavor is being contributed from the whey that is added into the dressing component. Given that the total protein in the various types of cottage cheese is the same and thus the whey protein is the same, the main difference in these products is mainly in the fat content and also potentially the actual amount of whey that is added to the dressing.

Thaumatin was added to 4% fat cottage cheese by stirring into the dressing component of the cottage cheese to have 0, 2 ppm, and 4 ppm thaumatin in the end sample.

Sample I contained 2 ppm thaumatin. Participants stated that Sample I had a reduction in whey flavor notes when compared to the control.

Sample J contained 4 ppm thaumatin. Participants stated that Sample J did have reduced whey flavor notes, but not as reduced as in Sample I.

Additional samples were prepared to analyze the effect of thaumatin on cottage cheese having varying fat content. Similar to the method discussed above 2 ppm thaumatin was added to cottage cheese having 0% fat, 2% fat and 4% fat. The thaumatin was added to the dressing component of the cottage cheese.

Sample K was prepared using cottage cheese having 0% fat to which 2 ppm thaumatin was added. Participants stated that Sample K did have less cardboard flavors and was less sour, but still was bitter at the end compared to the control with 0% fat.

Sample L was prepared using cottage cheese having 2% fat to which 2 ppm thaumatin was added. Participants stated that Sample L was saltier with a milky flavor at the end compared to the control with 2% fat.

Sample M was prepared using cottage cheese having 4% fat to which 2 ppm thaumatin was added. Participants stated that Sample M had a milkier initial taste and no whey aftertaste compared to the control with 4% fat.

For samples K, L, and M, participants indicated that 2 ppm thaumatin appeared to have a more significant impact on reducing whey flavor notes for the 2% and 4% samples than the 0% fat sample.

Example 6

Thaumatin was added to a whey protein concentrate (WPC) material manufactured by Kraft Foods® and as described in EP1698231B1, incorporated herein by reference, to determine if there is a similar effect to that described above in Examples 1-4. Samples were produced by stirring thaumatin into WPC at 0, 1 ppm, and 4 ppm and tasting as is.

Sample N contained 1 ppm thaumatin. Participants stated that Sample N had a reduction in whey flavor notes when compared to the control.

Sample O contained 4 ppm thaumatin. Participants stated that Sample O had a reduction in whey flavor notes, but not as reduced as in Sample N.

Example 7

The effect of thaumatin on processed cheese was also evaluated. Kraft Singles made with 2% milk. The processed cheese was melted in a microwave and then mixed with thaumatin in a water solution.

Sample P contained 1 ppm thaumatin. Participants stated that Sample P had a mild milk flavor.

Sample Q contained 2 ppm thaumatin. Participants stated that Sample Q had a more milky and rounded flavor with less sharpness at the end compared to Sample P. Participants indicated that Sample Q had masked the whey flavors more than Sample P.

Example 8

Additional tests were performed to determine the applicability of thaumatin in other products, such as dry cheese powder. The thaumatin may be added to the dry cheese powder and then made into a dairy based sauce. Thaumatin was added in varying amounts to a powdered cheese sauce mix containing whey, corn syrup solids, palm oil, milk fat, milk protein concentrate, salt, and other minor additives such as citric acid, sodium phosphate, gura gum, high acid whey, lactic acid, calcium phosphate and modified food starch. Each of the samples was prepared to have 50 g of dry cheese powder which was mixed with 50 g of hot water for tasting.

Sample R was a control containing 0 ppm thaumatin. Participants commented that this sample was sweet, sour and savory, with some caramel/cooked flavor and cheese flavor characteristics and had ended with an after taste of whey/barnyard/hay.

Sample S contained 1 ppm thaumatin. Participants stated that some whey was perceived and that Sample S seemed to be more bitter and saltier, but not as sour as control Sample R.

Sample T contained 2 ppm thaumatin. Participants stated that Sample T was similar to Sample S as whey flavor was detected and that the sample was saltier than control Sample R. Further, participants stated that Sample T was slightly sour and slightly more cheesey than control Sample R.

Sample U contained 5 ppm thaumatin. Participants stated that Sample U was perceived as being more sour, having a cooked flavor with less caramel flavor than control Sample R. Sample U finished cleaner with no whey aftertaste.

The matter set forth in the foregoing description is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. A whey containing cream cheese comprising:
   cream cheese curd;
   whey protein concentrate;
   fat, but no more than about 10% fat;
   about 0.01 ppm to about 1 ppm thaumatin to mask flavor notes imparted to the cream cheese from the whey protein concentrate; and
   a ratio of whey from the whey protein concentrate to the thaumatin from about 1,200,000:1 to about 4000:1,
   wherein the thaumatin is the only sweetener added.

2. The whey containing cream cheese of claim 1, wherein the thaumatin is in a range of about 0.1 ppm to about 1 ppm.

3. The whey containing cream cheese of claim 1, wherein the fat is in an amount of about 10%.

* * * * *